(12) United States Patent
Curtis et al.

(10) Patent No.: US 7,102,961 B2
(45) Date of Patent: Sep. 5, 2006

(54) INSTALLATION OF SEISMIC SURVEY DEVICES IN SHALLOW, LOW-ANGLE BOREHOLES

(75) Inventors: Michael P. Curtis, Houston, TX (US); Tacio Jose de Oliveira DaSilva, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 822 days.

(21) Appl. No.: 10/131,688

(22) Filed: Apr. 24, 2002

(65) Prior Publication Data

US 2003/0202425 A1    Oct. 30, 2003

(51) Int. Cl.
*G01V 1/02* (2006.01)
*G01V 1/16* (2006.01)

(52) U.S. Cl. .......................... 367/58; 367/37; 181/106
(58) Field of Classification Search ............... 181/106; 367/15, 25, 37, 58; 175/50; 166/241, 250.39
See application file for complete search history.

(56) References Cited

U.S. PATENT DOCUMENTS

| | | | | |
|---|---|---|---|---|
| 4,295,542 A | * | 10/1981 | Reeves et al. ............... | 181/108 |
| 5,259,452 A | * | 11/1993 | Wittrisch ..................... | 166/250 |
| 5,481,502 A | * | 1/1996 | Cretin et al. ................. | 367/77 |
| 5,651,639 A | | 7/1997 | Wentworth et al. .......... | 405/184 |
| 5,721,538 A | * | 2/1998 | Tubel et al. .................. | 367/81 |
| 5,782,311 A | | 7/1998 | Wentworth ................... | 175/53 |
| 6,006,832 A | * | 12/1999 | Tubel et al. ................. | 166/250 |
| 6,065,538 A | | 5/2000 | Reimers et al. ......... | 166/250.01 |
| 6,129,486 A | | 10/2000 | Putnam ....................... | 405/184 |
| 6,244,375 B1 | | 6/2001 | Norris et al. ................ | 181/102 |

OTHER PUBLICATIONS

LMR Drilling UK Ltd "Technique" information from website at www.lmrdrill.co.uk/technique.html (accessed Jul. 5, 2002).
Longbore, Company "Case Histories" information for "Blind Wells" and "Pump and Treat" from website at www.longbore.com/us/CaseHistories6.htm (accessed Jul. 5, 2002).
A&L Underground, Inc., Environmental Division, information regarding SVE and Air Sparging from website at www.alunderground.com/enviro.htm (accessed Jul. 5, 2002).
"Record 5,600-ft Pipeline Crossing Installed" by Thomas G. Bender, Horizontal Drilling International, Inc. website at www.hdiinc.com/art1rec1.htm (accessed Jul. 5, 2002).
"Tundra Crossing is No Sweat for HDI" by Jody Parrish published in Directional Drilling Magazine from Horizontal Drilling International, Inc. website at www.hdiinc.com/art3tun.htm (accessed Jul. 5, 2002).

* cited by examiner

*Primary Examiner*—Ian J. Lobo
(74) *Attorney, Agent, or Firm*—Mark E. Scott; Conley Rose, P.C.

(57) ABSTRACT

The specification discloses a system and related method for installing seismic sensors in shallow, low-angle boreholes for obtaining conventional three-dimensional and four-dimensional seismic surveys. Installing seismic sensors in shallow, low-angle boreholes removes the sensing devices from surface anomalies that may affect seismic sensing performance. Moreover, installation of the seismic devices in this manner may be done in environmentally sensitive areas without undue environmental impact.

7 Claims, 3 Drawing Sheets

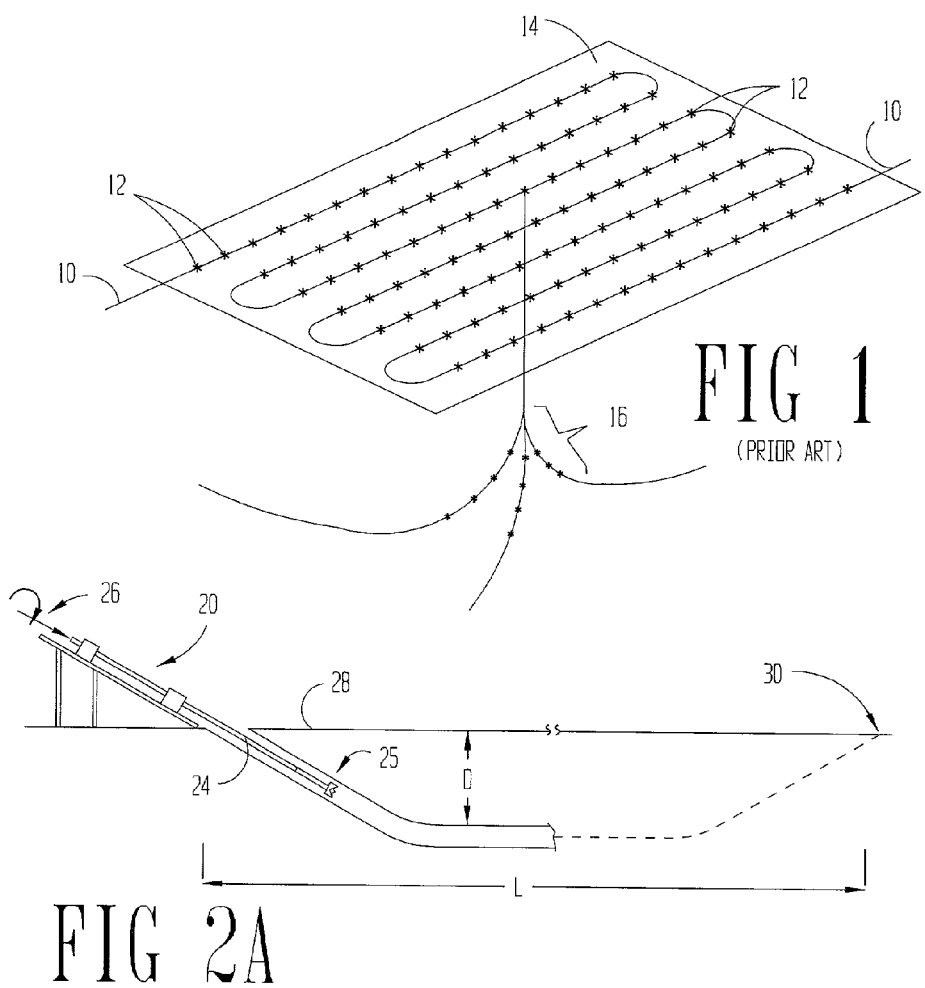
FIG 1
(PRIOR ART)
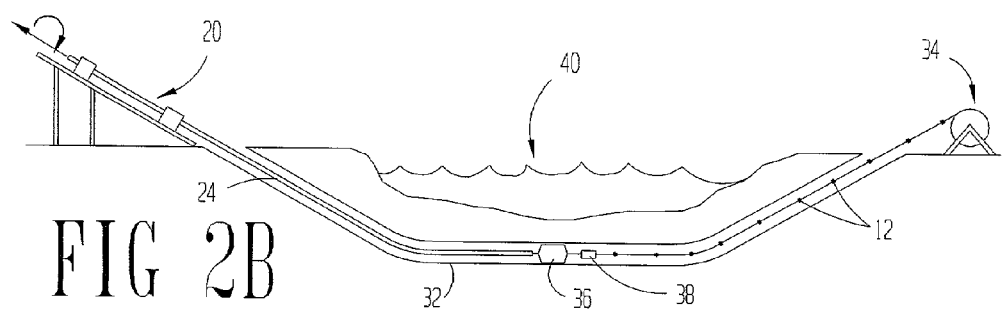
FIG 2A
FIG 2B

INSTALLATION OF SEISMIC SURVEY DEVICES IN SHALLOW, LOW-ANGLE BOREHOLES

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to obtaining seismic information regarding hydrocarbon producing reservoirs. More particularly, the preferred embodiments are directed to placing sensor equipment in shallow, low angle boreholes for acquisition of seismic information.

2. Background of the Invention

The key to efficient and economical extraction of hydrocarbons from subsurface formations is information. The primary informational sources relied on in the oil and gas industry are seismic graphs of the formation at issue. Early seismic graphs (sometimes referred to as seismographs) were two-dimensional in that the information they conveyed could be represented in only two axes. With the advent and application of computer processing in the seismic arts, geophysicists were able to further refine seismic techniques to obtain three-dimensional (3-D) seismic graphs of formations at issue. Such 3-D seismic graphs aid the oil and gas industry in the location and placement of both vertical and horizontal hydrocarbon-producing wells. That is, the 3-D seismic graphs may indicate the highest point of the producing formation, the highest point being the most efficient extraction point. As an additional example, some hydrocarbon-producing layers may be substantially horizontal, narrow bands. In such circumstances, a three-dimensional seismograph allows geologists to optimally place the horizontal components of a well bore.

Once hydrocarbon producing wells are in place, the need for information does not cease. The oil and gas industry tracks the extraction of the hydrocarbons of the formation over time for many reasons, e.g. to estimate remaining reserves, to track water encroachment, and the like. Tracking formations using seismic technology over time is generally referred to as four-dimensional (4-D) seismic. The fourth dimension in 4-D seismic is, of course, the time dimension, and it is this time dimension which introduces difficulties in obtaining the information. Several methods exist for obtaining 4-D seismic information. One such technique involves obtaining multiple 3-D seismic surveys using standard surface techniques. As one of ordinary skill in the art is aware, obtaining a seismic survey using surface techniques involves placing long strands of cable across the surface of the earth, the cable having periodically spaced seismic receiving devices. Generally speaking, the seismic receiving devices are placed in a grid pattern over or proximate to the formation of interest. FIG. 1 exemplifies placement of a cable 10 having seismic sensors 12 on the surface 14 of the earth. After the seismic receiving devices are placed, a seismic event is triggered, for example by detonation of dynamite or through the use of vibrator trucks which contact the surface of the earth and impart energy. The energy, whether created by dynamite or by trucks, propagates through the various earth layers to the formation of interest, and portions of the signal reflect back to the surface receivers.

Obtaining acoustic information in this manner is very time consuming and requires extensive access to the surface. For 4-D seismic using surface techniques to be viable, the process must be performed periodically, for example on a yearly basis. However, the repeatability of data obtained in this manner is questionable. First, the earth's surface, even over the course of a year, may change due to seasonal and other "weathering" factors, such as changes in water table levels. Further, it is impractical to guarantee that seismic sensors on the cables will have the precise coupling from year to year, or even that seismic sensors will be in the same precise location. Moreover, access to the surface to perform these type surveys may be limited, especially in environmentally sensitive areas or at certain times of the year. Thus, while obtaining 4-D seismic data using surface techniques is possible, it has many difficulties.

Related art techniques exist to permanently install the seismic sensors at or near the surface. The permanent installation could be by way of burying the cables and related seismic sensing devices in a trench a few inches or feet below the ground, or by placing the sensors in periodically spaced, relatively shallow vertical wells. These methods, however, require extensive surface access and may significantly damage or impair the surface in environmentally sensitive areas. In the marine context, these sensors are typically placed by hydrojet a few inches or feet below the surface. Anchors for ships, shrimping operations, and the like damage sensors placed this way.

A second method for obtaining seismic information is to place seismic sensors within the well bores of hydrocarbon producing wells. With the advent of deep horizontal drilling, it is common to drill a single vertical well bore from the surface to several thousand feet deep, and then extend from the vertical well a series of horizontal wells into the hydrocarbon producing formation to maximize hydrocarbon extraction. The horizontal wells, however, do not make right angles to the vertical well bore, but instead have a radius of curvature such that, if they go as planned, they become substantially horizontal as they enter the formation of interest. Thus, there are locations in the curved portion of the well bores (see 16 of FIG. 1) where the prior art seismic sensing devices are placed. However, placement of seismic sensing devices in these portions of the well bores has difficulties. The first difficulty is that these well bores are usually hydrocarbon producing well bores, and thus the seismic sensors may interfere with other downhole devices, such as production tubing, valves, scaler sensors (such as pressure and temperature), and the like. Secondly, the pattern of the horizontal well bores is optimized for production, and not seismic sensing.

A third method in the oil and gas industry for placement of seismic sensors is drilling a dedicated survey well, such as the system suggested in U.S. Pat. No. 6,065,538. While the survey well suggested in the '538 patent may address the problems associated with attempting to permanently install seismic sensors in a production well bore, and also the repeatability problems of a surface seismic survey, the cost of drilling a deep survey well (on the order of 8,000 feet), with no offset in hydrocarbon production, is in many cases prohibitive.

Thus, what is needed in the art is a mechanism whereby seismic sensors can be permanently or semi-permanently installed for 3-D and 4-D seismic purposes without the surface-intensive practices of surface seismic surveys or the relatively high cost of drilling deep survey wells.

BRIEF SUMMARY OF SOME OF THE PREFERRED EMBODIMENTS

The problems noted above are solved in large part by a system and method of installing seismic sensor equipment in shallow, low-angle boreholes. The shallow, low-angle boreholes of the preferred embodiment are produced, not necessarily from hydrocarbon drilling techniques, but from the arts of horizontal surface drilling, e.g. for pipe installation, fiber optic cable installation, and the like. In the preferred embodiment, a series of shallow, low-angle boreholes are drilled from a single pad site. These shallow, low-angle boreholes are preferably below the weathering layer of the surface, but are significantly above the hydrocarbon formations of interest. The shallow, low-angle boreholes may extend in a radial pattern from the single pad site, or may be drilled to be substantially parallel to each other at depth. Preferably seismic sensors are permanently or semi-permanently installed in the shallow, low-angle boreholes, and the sensors are used to obtain 3-D and 4-D seismic information. Thus, sensors of the preferred embodiments stay in place for a long time, increasing the repeatability of seismic measurements. The shallow, low-angle boreholes may also house other devices such as acoustic sensing devices, and the like. Further, the shallow, low-angle boreholes may also house seismic or acoustic sources for imparting energy into the earth formations for creation of 3-D and 4-D seismic information.

The disclosed devices and methods comprise a combination of features and advantages which overcome the deficiencies of the prior art devices by providing a method and system for making seismic surveys when access to the surface is not feasible, or when such access is environmentally unacceptable. The disclosed devices also overcome the deficiencies of drilling deep survey wells to obtain seismic data. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 1 shows prior art systems for obtaining seismic surveys;

FIG. 2A shows an elevational side view of a horizontal or directional drilling equipment used in the preferred embodiment;

FIG. 2B shows an elevational side view of creating the shallow, low-angle boreholes of the preferred embodiment;

NOTATION AND NOMENCLATURE

Figure 3A:
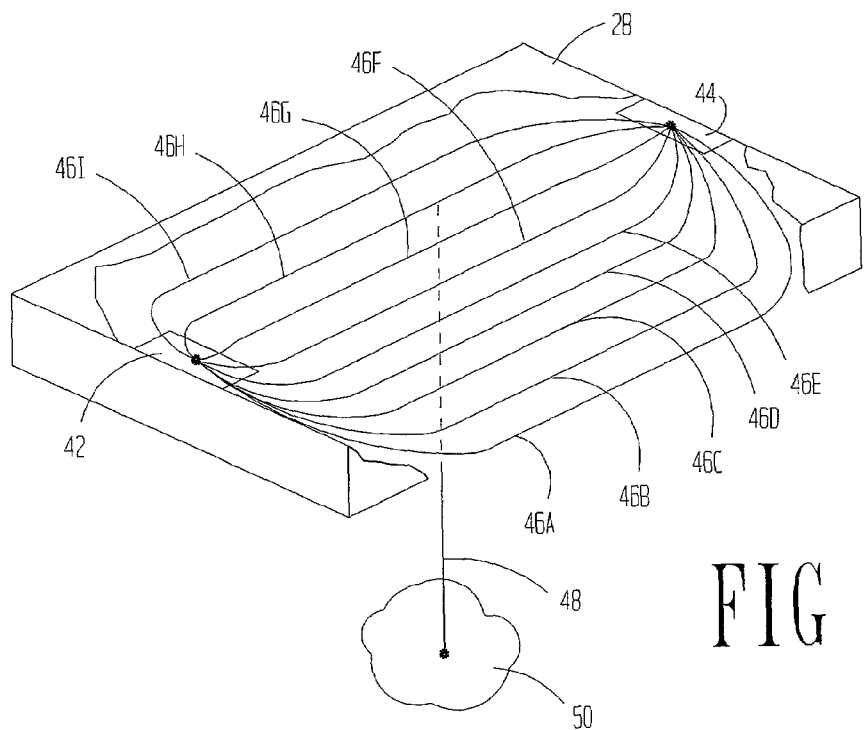
FIG. 3A shows a perspective view of one possible layout of shallow, low-angle boreholes of the preferred embodiment.

Certain terms are used throughout the following description and claims to refer to particular system components. This document does not intend to distinguish between components that differ in name but not function.

As used herein, the term "borehole" is used to denote a hole drilled in the surface of the earth for purposes other than hydrocarbon production. By contrast, the term "well bore" is used herein to denote a hole drilled for purposes of hydrocarbon production, or a hole drilled proximate to hydrocarbon producing formations.

DETAILED DESCRIPTION OF THE PREFERRED EMBODIMENTS

The preferred embodiments of the present invention are directed to permanently or semi-permanently installing seismic sources and seismic sensors in shallow, low-angle boreholes for the generation of four dimensional (4-D) seismic information. More particularly, the preferred embodiments comprise installation of seismic sensing devices in shallow, low-angle boreholes below the weathering layer, which may comprise surface and shallow subsurface anomalies, to obtain 4-D seismographs of hydrocarbon producing formations. Installing the seismic sensors in the shallow, low-angle boreholes increases repeatability of seismic tests by removing the erosion and weathering factors that affect surface seismic tests. Further, installing seismic sensors in this manner is more cost effective than drilling non-hydrocarbon producing survey well bores as suggested by the prior art. Moreover, in environmentally sensitive areas or otherwise inaccessible areas, such as marshes, across river beds, and in shallow marine applications, the seismic sensors may be permanently or semi-permanently installed under these surface anomalies from a single location, minimizing environmental impact and/or installation costs.

FIG. 2A shows an elevational side view of a horizontal or directional equipment 20 used in the preferred embodiments. It is noted that drilling of the shallow, low-angle boreholes may start at a substantial angle relative to the surface 28. FIG. 2A shows a drill bit 25 attached to a drill string 24. As indicated by the directional arrows, generally denoted 26, the horizontal drilling equipment 20 has the capability of rotating the drill string 24 and drill bit 25 while also horizontally translating the drill string to facilitate drilling. While the horizontal translation and rotation is shown in FIG. 2A, it must be understood that other directional horizontal drilling systems may be appropriate in particular circumstances. For example, where large diameter holes are required, rotation of the drill string may be replaced by a motor downhole that turns the drilling bit using the pressure of drilling fluid as the motive force. Likewise, where relatively small diameter holes are required, which may be the case in the installation of seismic sensors, the horizontal drilling device may not "drill" in the classic sense, but may instead simply push pipe through the ground. In the preferred embodiments, the horizontal directional drilling is made to level out at a particular depth D below the surface 28, after some transitory portion from the surface. The depth D used will vary depending upon the situation. Generally speaking, the seismic sensors of the preferred embodiments are placed below layers whose seismic characteristics are affected by surface conditions—the weathering layer. In the great majority of installations, the shallow, low-angle boreholes will only be twenty to fifty feet to be beneath the surface. However, in some locations, such as Saudi Arabia, the surface sand may extend down 100 feet or more, and in these circumstances the preferred embodiment would have a depth below the surface sand. In cold climates such as Alaska and inside the Arctic Circle, the preferred embodiments would be below the permafrost line, which may extend to a depth of 500 feet or more. Likewise, in marine applications, the shallow, low-angle borehole preferably would have a depth below the silt layer.

FIG. 2A also shows that the hole created by the directional horizontal drilling equipment 20 has a particular length L. The length, too, may be dependent upon several factors. For example, if the hydrocarbon producing formation for which the 4-D seismic information is desired is relatively small, it may be that the horizontal drilling equipment 20 may be capable of drilling boreholes with a length L sufficient to span the formation for 4-D seismic purposes. If, however, the hydrocarbon formation of interest is relatively large, length limitations of the horizontal drilling may be overcome by producing a plurality of holes in a radial pattern (discussed more fully below). As of the writing of this specification, the technology in shallow, low-angle borehole drilling is capable of producing lengths in excess of 5,000 feet for relatively large diameter, i.e. 30 inch, pipe. Inasmuch as the seismic sensors of the preferred embodiments fit within a three to five inch internal diameter (ID) or smaller, lengths in excess of two miles may be achievable.

FIG. 2A also shows that at some point, the horizontal hole may need to reach the surface. In FIG. 2A this point is shown as location 30. Though not specifically drawn in FIG. 2A, a second horizontal directional drilling machine, similar to that of 20, may be required at the end 30. Before proceeding, it must be understood that the borehole drilled by the directional horizontal drilling machine need not necessarily emerge at a distant location 30. Indeed, in the preferred embodiment the shallow, low-angle boreholes do not emerge, and rather extend such as that shown in FIG. 4, discussed more below.

The seismic sensors of the preferred embodiments could be installed in a pipe, liner or lining device, for example a steel or plastic tubing. The sensors themselves could be inside a liner, integrated within the lining, or coupled to an outside of the liner. The tubing could be pushed into the hole previously created, moved in by wireline technique, hydraulically forced in, or drug in by way of a tractor mechanism. Generally, if the shallow, low-angle borehole extends through rock layers, no liner is required. If, however, the shallow, low-angle boreholes extend through loose soil or through wet conditions, a liner may be required.

FIG. 2B shows an elevational view of creating the shallow, low-angle boreholes of an embodiment in which the entry and exit points connect, and also shows a surface anomaly traversed. In particular, in FIG. 2B the horizontal borehole 32, or at least a pilot hole thereof, has already been drilled. In this case, the horizontal drilling equipment 20 is shown pulling sensor cable 34 through the horizontal borehole. Although not specifically required given the proportions of the sensor cable 34 and the borehole 32, this pull-back may include use of a reamer 36, which increases the diameter of the hole, as well as a swivel couple 38, which allows the sensor cable 34 to remain untwisted in spite of the twisting of the drill string 24. As can be appreciated from the drawing of FIG. 2B, permanently or semi-permanently installing the sensor cable 34 under a surface anomaly, in this case a river 40, drastically increases the repeatability and practicality of repeated seismic surveys. Although FIG. 2B shows the sensor cable entering the borehole directly, in the preferred embodiments the sensor cable is within a lining, for example metal or plastic tubing. Thus, the sensor cables may eventually be removed, leaving the lining in place. When additional seismic surveys are required, the sensor cables are re-installed.

The above discussion regarding directional horizontal drilling to create the shallow, low-angle boreholes is not meant to be an exhaustive description as to the various methods and equipment required; rather, the above discussion is simply to apprise one of ordinary skill in the art of how such technology operates in general, and how it is applicable to sub-surface yet shallow installation of seismic sensors. Many companies throughout the world provide such horizontal drilling services, such as: A & L Underground, Inc., 14700 West 107$^{th}$ Street, Lenexa, Kans. 66215; Horizontal Drilling International, Inc., 3430 Rogerdale Road, Houston, Tex. 77042; Longbore, Inc., 4125 Southerland, Houston, Tex. 77092.

Figure 3B:
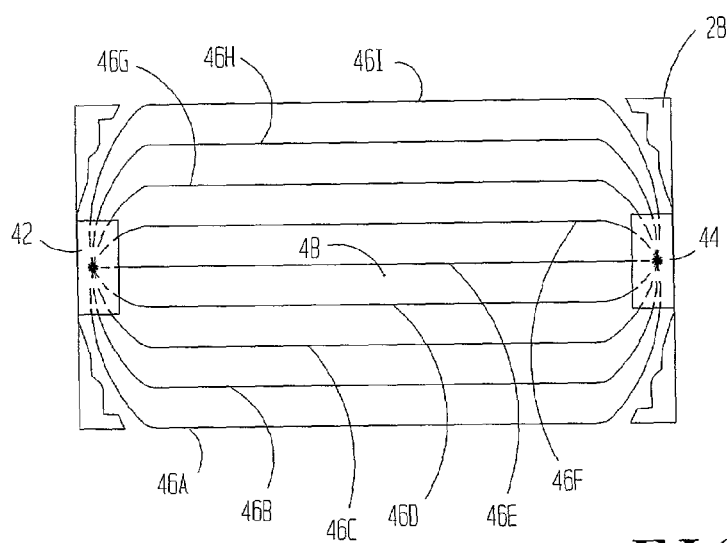
FIG. 3B shows an overhead view of the exemplary set of shallow, low-angle boreholes shown in FIG. 3A.

FIG. 3A shows a perspective view of one possible layout of the shallow, low-angle boreholes of the preferred embodiment. In particular, FIG. 3A shows the surface of the earth 28 as well as two pad sites 42 and 44. It is from these pad sites that the shallow, low-angle boreholes are drilled. In the system shown in FIG. 3A, eight such shallow, low-angle boreholes 46A–I are shown, although any number may be used. These various shallow, low-angle boreholes may be situated above, for example, a well bore 48 tapping into a hydrocarbon producing formation 50. FIG. 3B shows an overhead view of the exemplary set of shallow, low-angle boreholes centered over the vertical well bore 48. Preferably, one or more of the shallow, low-angle boreholes 46A–I contain some form of sensing device spaced periodically within the borehole. In one embodiment, the sensing devices are seismic sensing devices, but other devices may be equivalently used, such as environmental sensing devices, such as temperature, salinity and resistivity.

FIGS. 3A and 3B show the shallow, low-angle boreholes 46A–I connected to each pad site 42, 44. Pad sites 42, 44 are the locations where the horizontal drilling equipment 20 is placed during creation of the shallow, low-angle boreholes, but these pad sites are also the location for electrically coupling to the sensing devices in the shallow, low-angle boreholes 46A–I. Once one or more of the shallow, low-angle boreholes 46A–I has the sensing devices therein, some kind of disturbance is created, which could be detonation of dynamite, the use of vibrator trucks, or preferably the use of source devices placed within one of the shallow, low-angle boreholes 46A–I.

Figure 4:
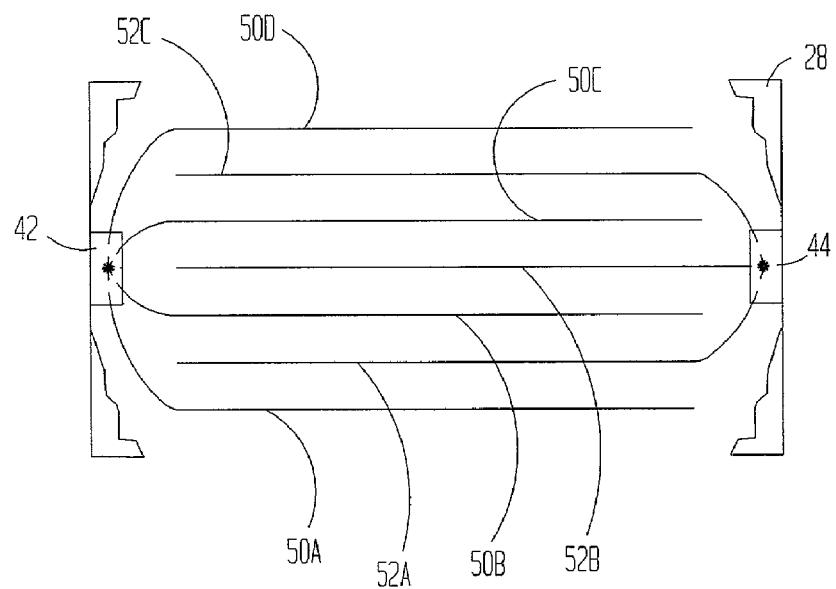
FIG. 4 shows an overhead view of a second embodiment of the shallow, low-angle boreholes.

FIG. 4 shows an overhead view of another embodiment in which the shallow, low-angle boreholes do not couple from pad 42 to pad 44. In particular, the shallow, low-angle boreholes extending from pad 42 (boreholes 50A–D) interlace with, but are not in communication with, the shallow, low-angle boreholes extending from pad 44 (boreholes 52A–C). An exemplary arrangement for the system shown in FIG. 4 is to have periodically spaced seismic sensors in the shallow, low-angle boreholes 50A–D, and a series of periodically spaced seismic sources in the interlacing shallow, low-angle boreholes 52A–C.

Figure 5:
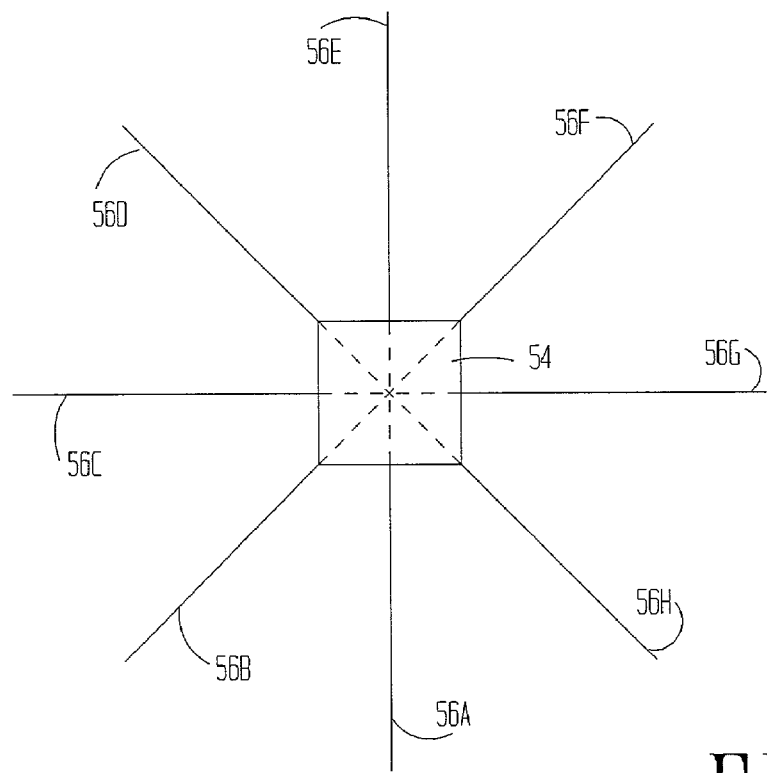
FIG. 5 shows yet another exemplary layout for the shallow, low-angle boreholes.

FIG. 5 shows yet another exemplary, layout for the shallow, low-angle boreholes of the preferred embodiment. In particular, a single center pad 54 forms the hub for a plurality of shallow, low-angle boreholes 56A–H extending in a radial pattern. As can be appreciated, if each of the shallow, low-angle boreholes may reach a distance of two miles from the center pad 54, then it is possible that the radial pattern exemplified in FIG. 5 could cover an area of approximately twelve square miles. As the state of the technology in horizontal drilling advances, the distances that may be traversed by these shallow, low-angle boreholes may increase, and these increases in distance are within the contemplation of this invention.

As one of ordinary skill in the art is aware, hydrocarbon producing formations may only be viable for a limited amount of time, for example a formation may be depleted after ten years of production. After depletion of the hydrocarbon formation, it may be desirable to remove the seismic sensing devices (or liners if applicable) from the shallow, low-angle boreholes. Removal of these devices may take place at the one or more pad sites 42, 44. Moreover, in environmentally sensitive areas, only relatively small surface areas, namely the pad sites, would need to be remediated, thus eliminating all evidence that the seismic techniques were employed.

The above discussion is meant to be illustrative of the principles and various embodiments of the present invention. Numerous variations and modifications will become apparent to those skilled in the art once the above disclosure is fully appreciated. For example, many sensing devices other than seismic sensors may be installed in the shallow, low-angle boreholes, such as acoustic, micro-seismic, electrical (resistivity, electromagnetic), gravimetric, nuclear, attitude (dip, orientation, elevation), geochemical and geo-mechanical. Moreover, the various patterns for the boreholes are merely exemplary, and non-periodic patterns would be operational, though not preferred. It is intended that the following claims be interpreted to embrace all such variations and modifications.

What is claimed is:

1. A system for making seismic measurements of an earth formation comprising:
   a first pad site on the surface earth;
   a plurality of shallow, low-angle boreholes extending from the first pad site;
   a second pad site, and wherein the plurality of shallow, low-angle boreholes extend between the first and second pad sites;
   seismic sensing devices within at least one of the plurality of shallow, low-angle boreholes;
   a seismic source in operational relationship to the seismic sensors and the earth formation; and
   wherein the seismic source creates energy, and the seismic sensing devices sense portions of the energy that reflect from the earth formation.

2. The system as defined in claim 1 wherein the plurality of shallow, low-angle boreholes extending between the first and second pad sites are substantially parallel to each other.

3. A system for making seismic measurements of an earth formation comprising:
   a first pad site on the surface of the earth;
   a plurality of shallow, low-angle boreholes extending from the first pad site;
   seismic sensing devices within at least one of the plurality of shallow, low-angle boreholes;
   a lining within the plurality of shallow, low-angle boreholes, wherein the seismic sensing devices are integrated within the lining;
   a seismic source in operational relationship to the seismic sensors and the earth formation; and
   wherein the seismic source creates energy, and the seismic sensing devices sense portions of the energy that reflect from the earth formation.

4. A system for making seismic measurements of an earth formation comprising:
   a first pad site on the surface the earth;
   a plurality of shallow, low-angle boreholes extending from the first pad site;
   seismic sensing devices within at least one of the plurality of shallow, low-angle boreholes;
   a lining within the plurality of shallow, low-angle boreholes, wherein the seismic sensing devices are coupled to an outside portion of the lining;
   a seismic source in operational relationship to the seismic sensors and the earth formation; and
   wherein the seismic source creates energy, and the seismic sensing devices sense portions of the energy that reflect from the earth formation.

5. A method of installing a sensing device for monitoring a hydrocarbon producing formation, the method comprising:
   drilling a shallow, low-angle borehole;
   installing in the shallow, low-angle borehole a liner with a sensing device integrated with the liner;
   operating a source device; and
   sensing a state of the hydrocarbon producing formation with the sensing device.

6. A method of installing a sensing device for monitoring a hydrocarbon producing formation, the method comprising:
   drilling a shallow, low-angle borehole;
   installing in the shallow, low-angle borehole a liner with a sensing device coupled to the outside of the liner;
   operating a source device; and
   sensing a state of the hydrocarbon on producing formation with the sensing device.

7. A system for making a seismic survey of an underground earth formation, the system comprising:
   a first pad site;
   a second pad site;
   a plurality of substantially horizontal boreholes proximate to the surface of the earth wherein the plurality of the substantially horizontal boreholes extend between the first pad site and the second pad site;
   a plurality of seismic sensing devices disposed at least one each in the plurality of substantially horizontal boreholes; and
   a seismic source in operational relationship to the plurality of seismic sensors and the underground earth formation.

* * * * *